(12) United States Patent
Wang et al.

(10) Patent No.: US 7,771,614 B2
(45) Date of Patent: Aug. 10, 2010

(54) LOW POWER BISTABLE DEVICE AND METHOD

(75) Inventors: Xin-Jiu Wang, San Jose, CA (US); Sunit Saxena, Monte Serena, CA (US)

(73) Assignee: Altierre Corporation, San Jose, CA (US)

( * ) Notice: Subject to any disclaimer, the term of this patent is extended or adjusted under 35 U.S.C. 154(b) by 0 days.

(21) Appl. No.: 11/945,230

(22) Filed: Nov. 26, 2007

(65) Prior Publication Data

US 2009/0136688 A1    May 28, 2009

(51) Int. Cl.
*C09K 19/00*   (2006.01)
*C09K 19/06*   (2006.01)
*C09K 19/52*   (2006.01)

(52) U.S. Cl. .............................. 252/299.01; 252/299.1; 428/1.1; 430/20

(58) Field of Classification Search ............ 252/299.01, 252/299.1; 430/20; 428/1.1
See application file for complete search history.

(56) References Cited

U.S. PATENT DOCUMENTS

| 6,963,435 | B2 * | 11/2005 | Mallya et al. | 359/238 |
|-----------|------|---------|---------------|---------|
| 7,023,600 | B2 * | 4/2006  | Mallya et al. | 359/238 |
| 2006/0027784 | A1 | 2/2006 | Francis et al. | |
| 2007/0200093 | A1 | 8/2007 | West et al. | |

OTHER PUBLICATIONS

PCT/US2008/84748 International Search Report dated Jan. 15, 2009.
PCT/US2008/84748 Written Opinion dated Jan. 15, 2009.

* cited by examiner

*Primary Examiner*—Geraldina Visconti
(74) *Attorney, Agent, or Firm*—DLA Piper LLP (US)

(57) ABSTRACT

A low power bistable device and method are provided.

23 Claims, 15 Drawing Sheets

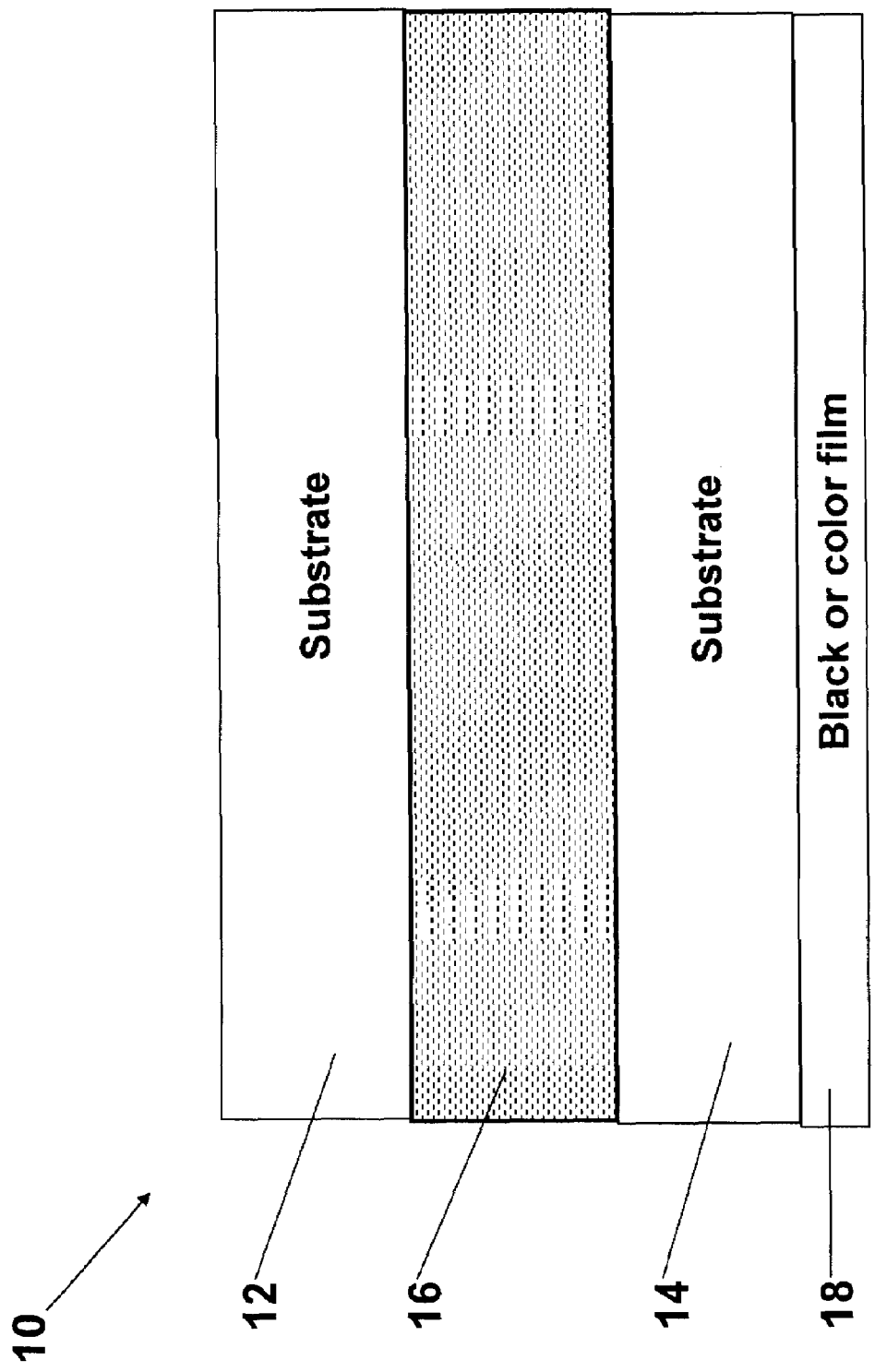

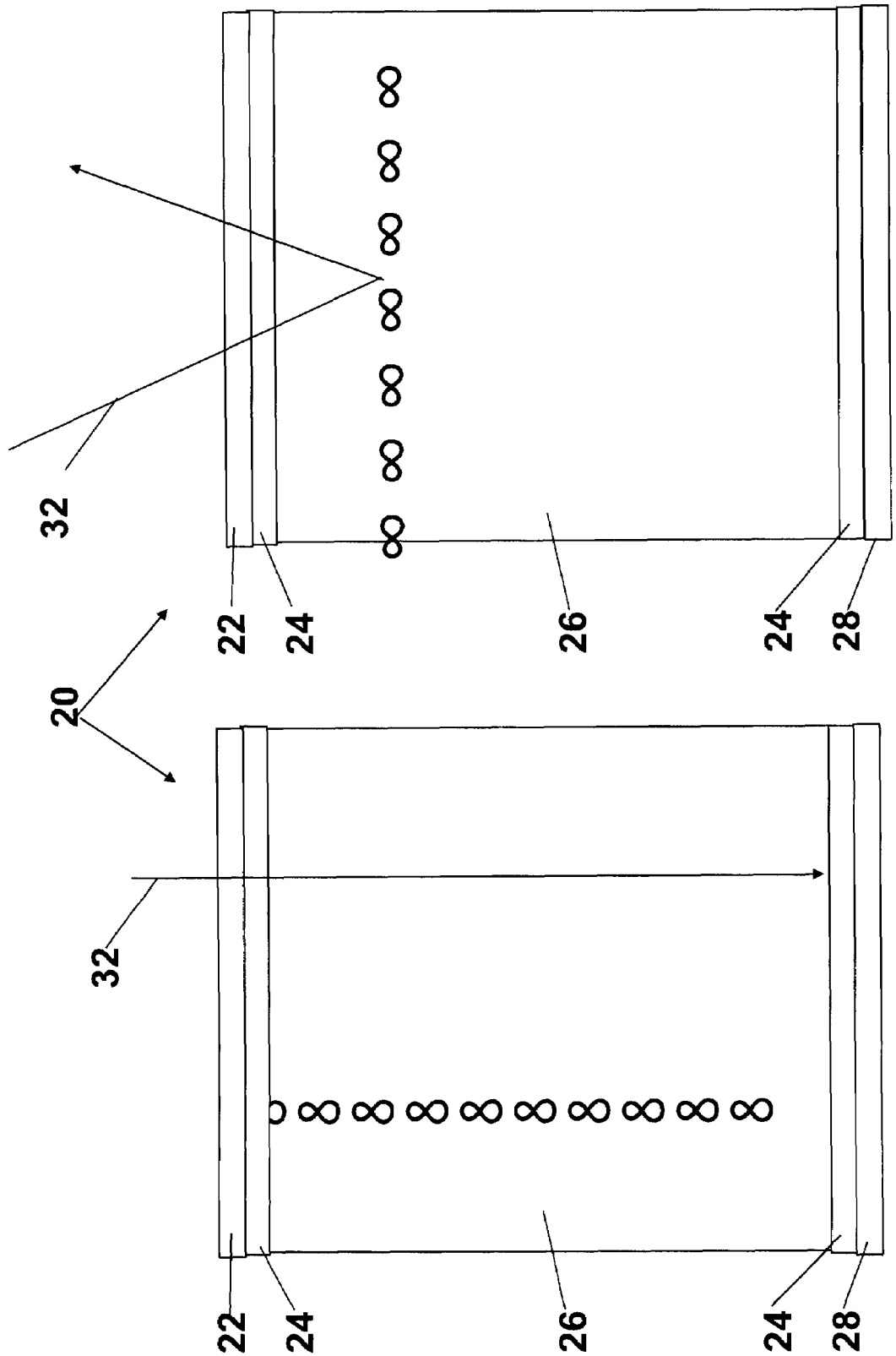

I – planar texture

II – focal conic texture

LOW POWER BISTABLE DEVICE AND METHOD

FIELD

A display device and in particular a low power bistable display device and method are disclosed.

BACKGROUND

A display device typically has an ON state and an OFF state wherein the display device is able to display information only when power is being continuously applied to the display device. For example, most televisions operate in this manner. Thus, these display devices have a single stable state in which the state of the display device is maintained without additional power being applied to the display device and the single stable state in the OFF state. The ON state is thus unstable since the ON state is only maintained by applying power to the display device. These typical display devices consume a significant amount of power since power must be applied to the display device to display an image or text.

Bistable display devices also exist that can, to some extent, maintain the ON state (and continue to display images/text) with reduced power consumption or no power consumption for an amount of time. Thus, the OFF state and the ON state are stable states because both states can be maintained without the application of a significant amount of additional power. There are a few different types of bistable displays, such as the electrophoretic displays, electrochromic displays, electrowetting displays, MEMS displays, and LCD displays. For the known bistable LCD displays, there are a few types including nematic types (ZBD and BiNem); cholesteric types (BCD and PDChLC) and smectic types (SSFLC and Smectic-A LCD).

FIG. 1 illustrates an example of the structure of a liquid crystal display 10. The display 10 has a first and second substrate 12, 14 (which typically may be made of glass) that contain and sandwich liquid crystal material 16. One or more of the substrates may also contain an electrode (often made of indium tin oxide since it is transparent to visible light) that provides power to the display and induces an electric field that is used to control the liquid crystal material and therefore display information. The display 10 may also have a layer 18 that absorbs light that passes through the liquid crystal in the ON state and produces a better black state in which the display is displaying information.

A cholesteric type liquid crystal is one of three major liquid crystal phases. In the cholesteric liquid crystal, the planar texture and the focal-conic texture are two stable textures. In the planar texture, the liquid crystal molecules are basically aligned to be parallel to the substrates. In other words, the helical axes of the cholesterics are perpendicular to the substrates. In the focal-conic texture, the helical axes of many cholesteric liquid crystal domains are randomly oriented with no preferred direction.

One type of cholesteric type liquid crystal display is a positive cholesteric bistable display. For the positive liquid crystal with the positive dielectric anisotropy, a high voltage is able to unwind the helix of cholesteric liquid crystal and turns them into a homeotropic state to orient along the electric field. Releasing the field, the liquid crystal will relax into either the planar texture or the focal conic texture, depending on how the post-field is applied. At a low post-voltage, the liquid crystal will end up at the focal conic texture. If the post-voltage is relatively high, the planar texture will be reached. In this device, both surfaces are homogeneously aligned but usually with no preferred azimuthal orientations.

The cholesteric liquid crystal may be tuned by the chiral dopants to have a particular intrinsic reflective spectra within the visible band. At the planar texture, a colored light is reflected back due to the so-called Bragg-like scattering. While in the focal conic texture, the incident light basically passes through the thin layer liquid crystal to reach aback layer behind the glass and hence the device takes on the color of that layer in that region.

Another type of conventional LCD display is a negative cholesteric LCD device. An enhancement to that device is a polymer-enhanced negative cholesteric liquid crystal (PENChLC). It works in the transmission mode and is basically a one-pixel panel. PENChLC utilizes polymer networks to establish bistability in negative cholesteric based displays. The ionic compounds are intentionally blended in the host liquid crystal solution to increase its conductivity. Thus, the polymer networks are built inside the liquid crystals to confine the mobility of liquid crystal molecules in order to establish the long term bistability. While these devices provide long term bistability, they are more difficult to manufacture and more expensive since the polymer network has to be added into the liquid crystal material. In addition, liquid crystal device fabrication lines prefer to not manufacture these devices with the polymer network since adding the polymer network is messy and introduces additional step(s) into the fabrication process so that the fabrication lines charge a premium to manufacture these devices which further increases the cost of the polymer network LCDs.

Thus, it is desirable to provide a lower power bi-stable device that provides long term bistability, but does not use polymer networks and it is to this end that the device and method are directed.

BRIEF DESCRIPTION OF THE DRAWINGS

FIG. 1 is a cut-away side view of a liquid crystal display device;

FIGS. 2A and 2B illustrate two states of a low power bistable display;

DETAILED DESCRIPTION OF ONE OR MORE EMBODIMENTS

The low power bistable display is particularly applicable to a cholesteric LCD which is a non polymer based bistable negative cholesteric display for low power image or text display applications and it is in this context that the low power, bistable display will be described. It will be appreciated, however, that the low power, bistable display has greater utility since it can be manufactured in other manners than those described below (as long as the display has the properties of the low power bistable display described below) and can be used for applications other than the low power image display applications described below and in particular can be used in any application in which it is desirable to have a display that has the ability to display an image, text, etc for long periods of time with minimal power consumption.

Figures 3A, 3B:
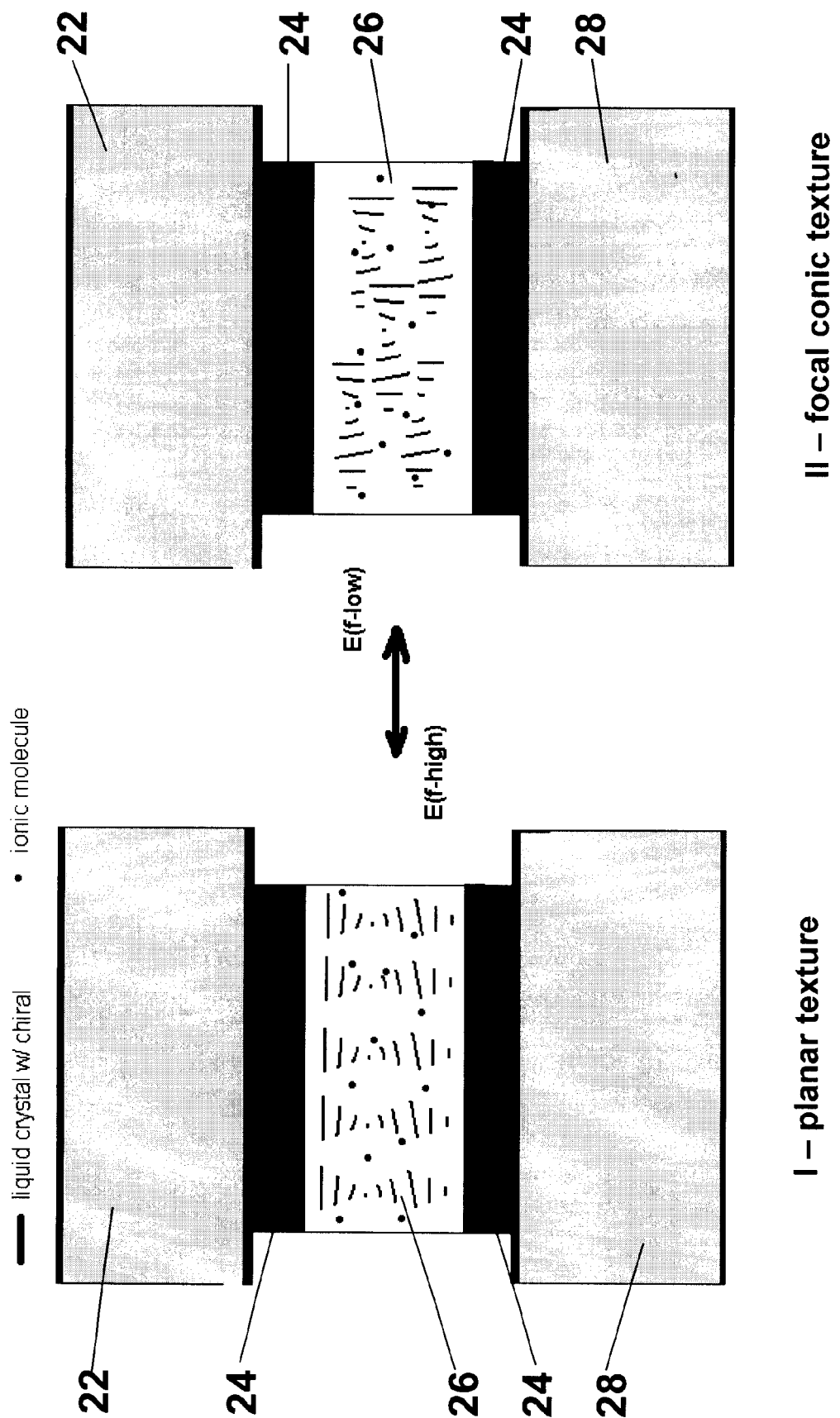
FIGS. 3A and 3B illustrate a planar texture and a focal conic texture of the low power bistable display.

FIGS. 2A and 2B illustrate two states of a low power bistable display 20 and FIGS. 3A and 3B illustrate a planar texture and a focal conic texture of the low power bistable display 20. The display 20 may have a top substrate 22, an optional alignment layer 24 (that may be on either the top substrate, bottom substrate or both) and liquid crystal material 26 sandwiched between the top substrate 22 and a bottom substrate 28. The display may also have one or more optical film layers (not shown) that will be shown and described below in more detail. As with other displays, a set of one or more electrodes (not shown) made of a material transparent to light, such as indium tin oxide (ITO), may be formed on the top or bottom substrate or optionally material not transparent to light on the bottom and may generate an electric field across particular portions of the liquid crystal material (defining a set of independently controllable pixels or segments of the liquid crystal material) to control the state of the liquid crystal material at particular areas of the display which allows the display to show text, numerals, images, etc, on the display. FIG. 2A shows a transmissive state of the low power display device (planar state) with the liquid crystal molecules parallel to the substrates) while FIG. 2B shows a reflective state of the low power display device (focal conic state with the liquid crystal molecules somewhat perpendicular to the substrates). Note that the states of the low power bistable display device are different from the states for a typical display device in which the planar state is a reflective state and the focal conic state is the relatively transparent state. Furthermore, the two states of the low power bistable display shown in FIGS. 2A and 2B are both stable and do not require the use of polymer network to produce the bi-stability as was required by the conventional bistable display devices. The display device 20 may also have a drive circuit (not shown) and a power supply, such as a battery, that supplies power to the electrodes to control the operation of the display device.

In one implementation of the low power bistable display, the liquid crystal material 26 may be a negative cholesteric liquid crystal material. A certain first frequency electric field is chosen such that when applied the negative dielectric anisotropy of the liquid crystals makes the liquid crystal molecules align perpendicular to the electric field so that the liquid crystals are forced to form the planar texture as shown in FIG. 2A. A certain second frequency field is chosen such that when it is applied, the liquid crystal molecules are forced into the focal conic state. The first frequency may be between 0.000001 MHz and 0.0005 MHz and in one embodiment, the first frequency is less than 0.0001 MHz with the voltage varied between 0V and 50V. The second frequency may be between 0.0005 MHz and 0.01 MHz and in one embodiment, the second frequency is less than 0.001 MHz and the voltage is varied between 0V and 50V. Thus, the focal conic texture is established as shown in FIGS. 2B and 3B. Thus, the low power, bistable display has long term bistability without the presence of the field. The liquid crystal material, in some embodiments, may also include glass beads, polymeric microfibers, polymeric microspheres, spacer beads and/or sticky glass beads, or other spacer methods which are and can be commonly used in the construction of LCD devices.

In one implementation, the alignment layers 24 may be one or more specially treated substrate surface(s) that impose the homeotropic alignment and the display 20 may include a backing material, that may be laminated on the back of the bottom substrate, to modify and enhance back reflection and refraction properties to form a low power bistable display with long term bistability. The homeotropic alignment is built on either or both substrates by depositing a polymer layer or by other means. By utilizing the bonding or coupling affinity between the liquid crystal material mixture and the alignment layer, the quality of each state and the bistability are much enhanced and promoted by this homeotropic alignment layer. A variety of surface treatments or lack thereof, can be used on either or both substrates for this and may include, but are not limited to either homeotropic or homogeneous alignment. Various materials including a for example, a polyimide can be coated on the surface of one or both substrate(s), and then cured, followed with or without mechanical action to form such homeotropic alignment.

In more detail, the low power bistable display uses the negative dielectric anisotropy of the negative liquid crystal. The low power bistable display has a transmissive state (as shown in FIG. 2A or 3A) and a reflective state (as shown in FIG. 2B or 3B). A certain frequency electric field is chosen such that when applied, the negative dielectric anisotropy of the liquid crystals makes the liquid crystal molecules align to be perpendicular to the electric field so that the liquid crystals are forced to form the planar texture as shown in FIGS. 2A and 3A. The liquid crystal molecules with the chiral and/or ionic doping have the characteristic that they allow visible incident light 32 to pass through the liquid crystal material. In particular, the cholesteric liquid crystal is doped by the chiral compounds so that the planar texture of the liquid crystals (shown in FIGS. 2A and 3A) are usable as a first optical state of the low power, bistable display device. Thus, in areas of the display in which the visible light passes through the liquid crystal material, the area will be transparent and may take on the appearance of a material behind the display in that area wherein the material may be dark, bright, colored or varied. When the electric field is relaxed (power being removed from the electrodes so an electric field is no longer being applied to the liquid crystal material), the planar texture will be kept for a long term so that any information displayed will be retained for a long period of time. The liquid crystal mixtures with the negative dielectric anisotropy and high birefringence are desirable in the low power, bistable display device.

In the reflective state as shown in FIG. 2B (also known as the focal conic texture as shown in FIG. 3B) of the low power, bistable display, the molecules of the liquid crystal material have domains of the helical axes of the molecules of the liquid crystal material pointing randomly at various directions which is represented by the molecules shown in FIGS. 2B and 3B. This is the second optical state of the low power, bistable display in which some, much or all of the incident light 32 is reflected by the molecules which results in wideband or narrow band reflection of the incident light. In this state, the areas of the display appear white or another color. In addition, the display may also include a back optical film layer (not shown) that further modulates the backscatter reflection.

The low power, bistable display may have a number of different configurations and the thickness of the liquid crystal material sandwiched between two substrates may be such that the balance between good optical contrast and the electronic driving voltage is achieved. In one embodiment, the thickness of the LCD material may range from 2 um to 30 um although other thicknesses also may be used. In addition, several sandwich structures can be created composed of either hard or flexible substrates whether or not treated by a polyimide and then separated by liquid crystal mixture as described in more detail below.

Figure 4:
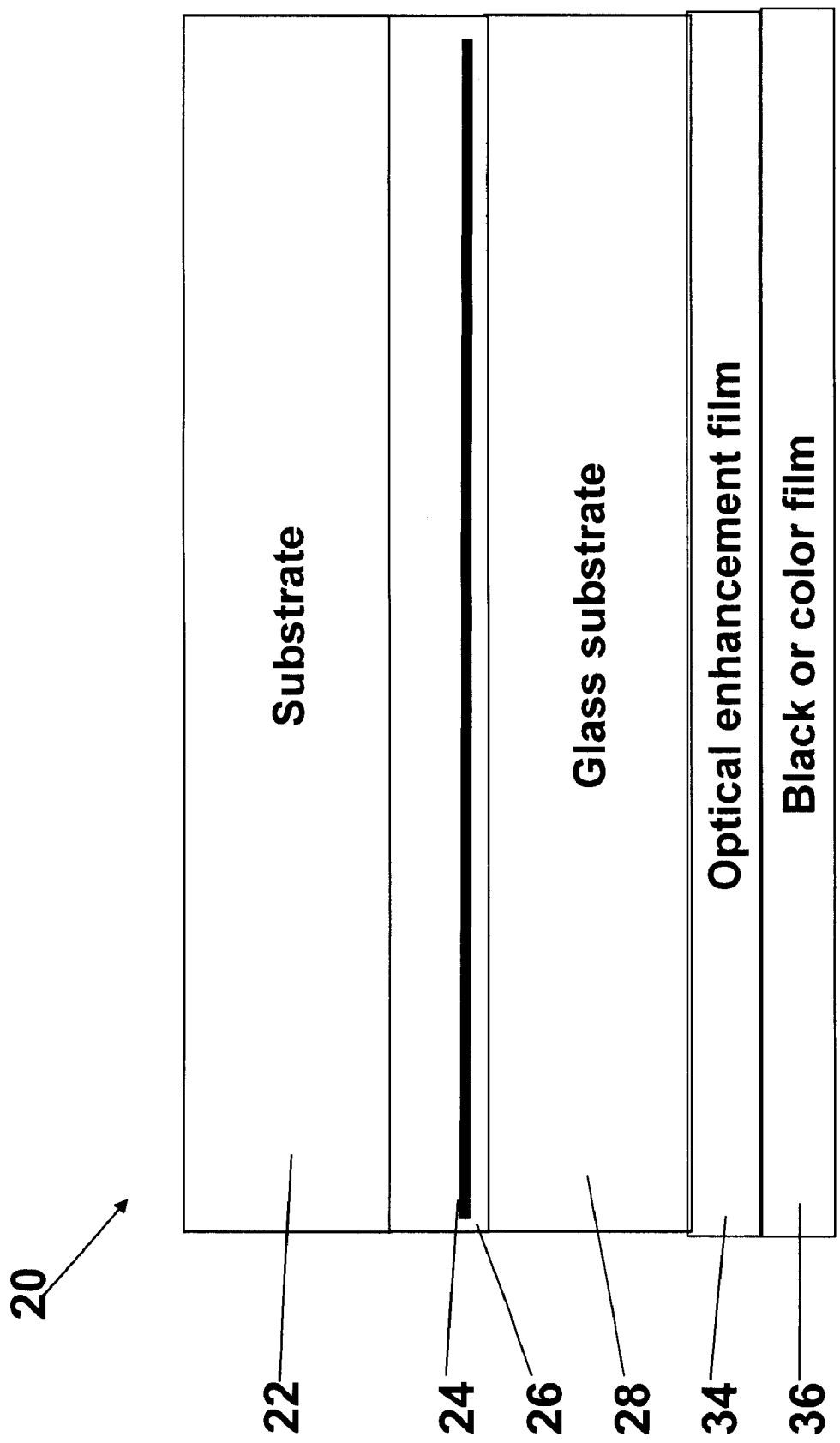
FIGS. 4-15 illustrate other embodiments of the low power, bistable display.
Figure 5:
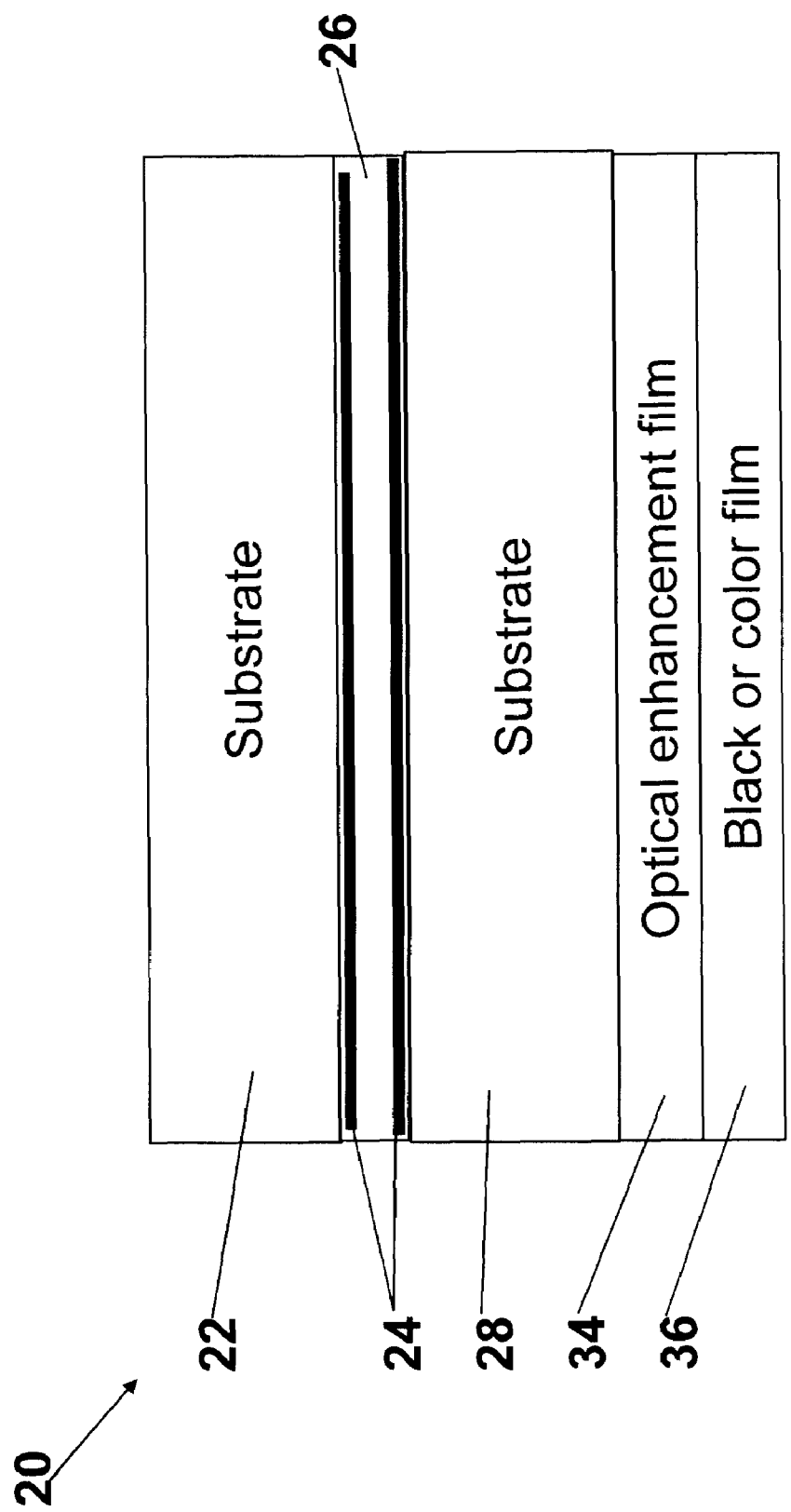
Figure 6:
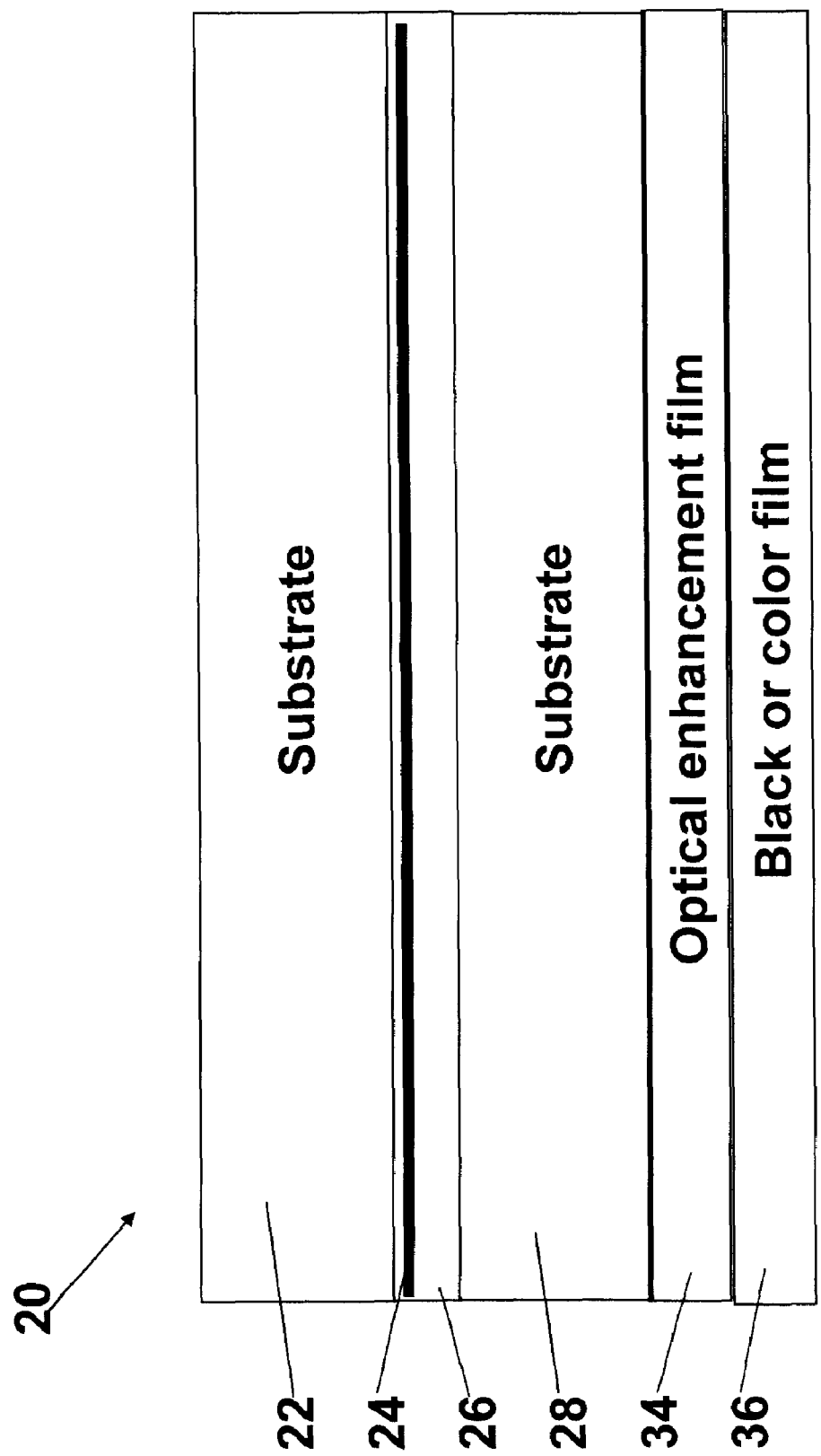
Figure 7:
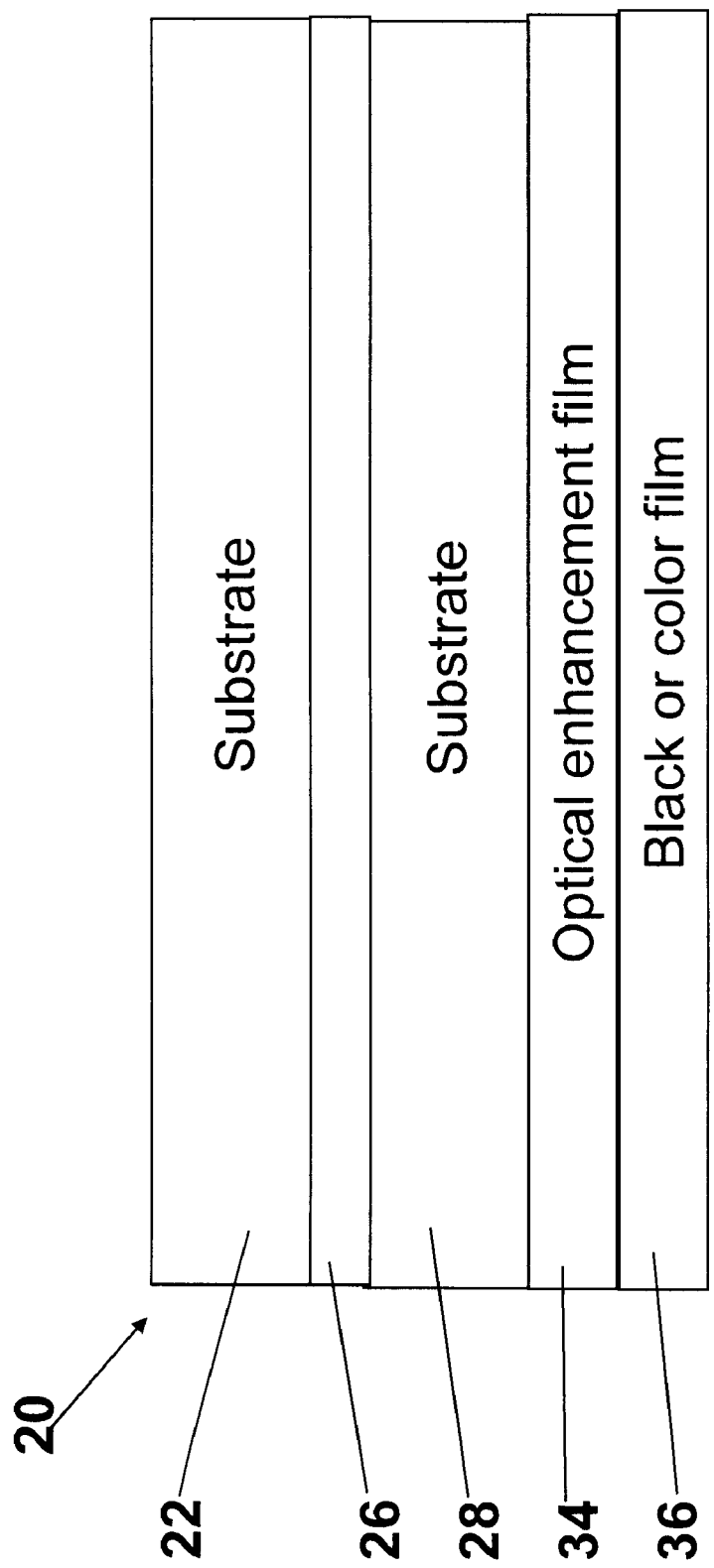
Figure 8:
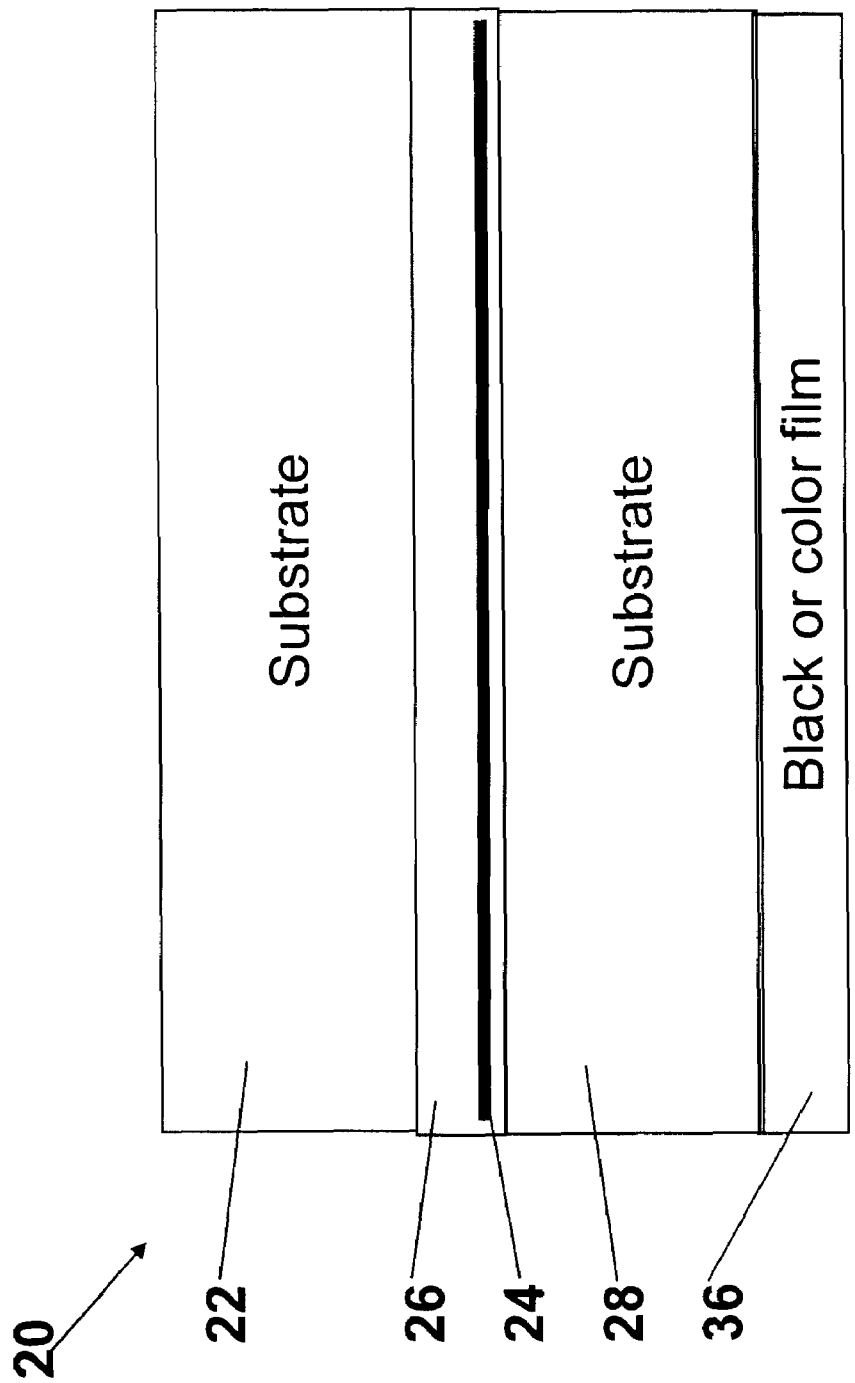

FIGS. 4-15 illustrate other embodiments of the low power, bistable display 20. As shown in FIG. 4, the display 20 in this embodiment includes the top and bottom substrates 22, 28, the liquid crystal material 26 with an alignment layer 24, an optical modulation layer 34 and a film layer 36 that may be black or a color film. The optical modulation layer may be plastic, glass or another material of various surface types. An example of the optical enhancement layer is a typical lightweight plastic diffuser. The film layer 36 may enhance the contrast of the dark, black or color state of the transmissive state of the display device. In the embodiment shown in FIG. 4, the display 20 may include the top and bottom substrates 22, 28, the liquid crystal material 26 with an alignment layer 24 on the bottom substrate, the optical enhancement layer 34 and the film layer 36 that may be black or a color film. In the embodiment shown in FIG. 5, the display 20 may include the top and bottom substrates 22, 28, the liquid crystal material 26 with an alignment layer 24 on each of the top and bottom substrates, the optical enhancement layer 34 and the film layer 36 that may be black or a color film. In the embodiment shown in FIG. 6, the display 20 may include the top and bottom substrates 22, 28, the liquid crystal material 26 with an alignment layer 24 on the top substrate, the optical enhancement layer 34 and the film layer 36 that may be black or a color film. In the embodiment shown in FIG. 7, the display 20 may include the top and bottom substrates 22, 28, the liquid crystal material 26, the optical enhancement layer 34 and the film layer 36 that may be black or a color film. In the embodiment shown in FIG. 8, the display 20 may include the top and bottom substrates 22, 28, the liquid crystal material 26 with the alignment layer 24 on the bottom substrate and the film layer 36 that may be black or a color film.

Figure 9:
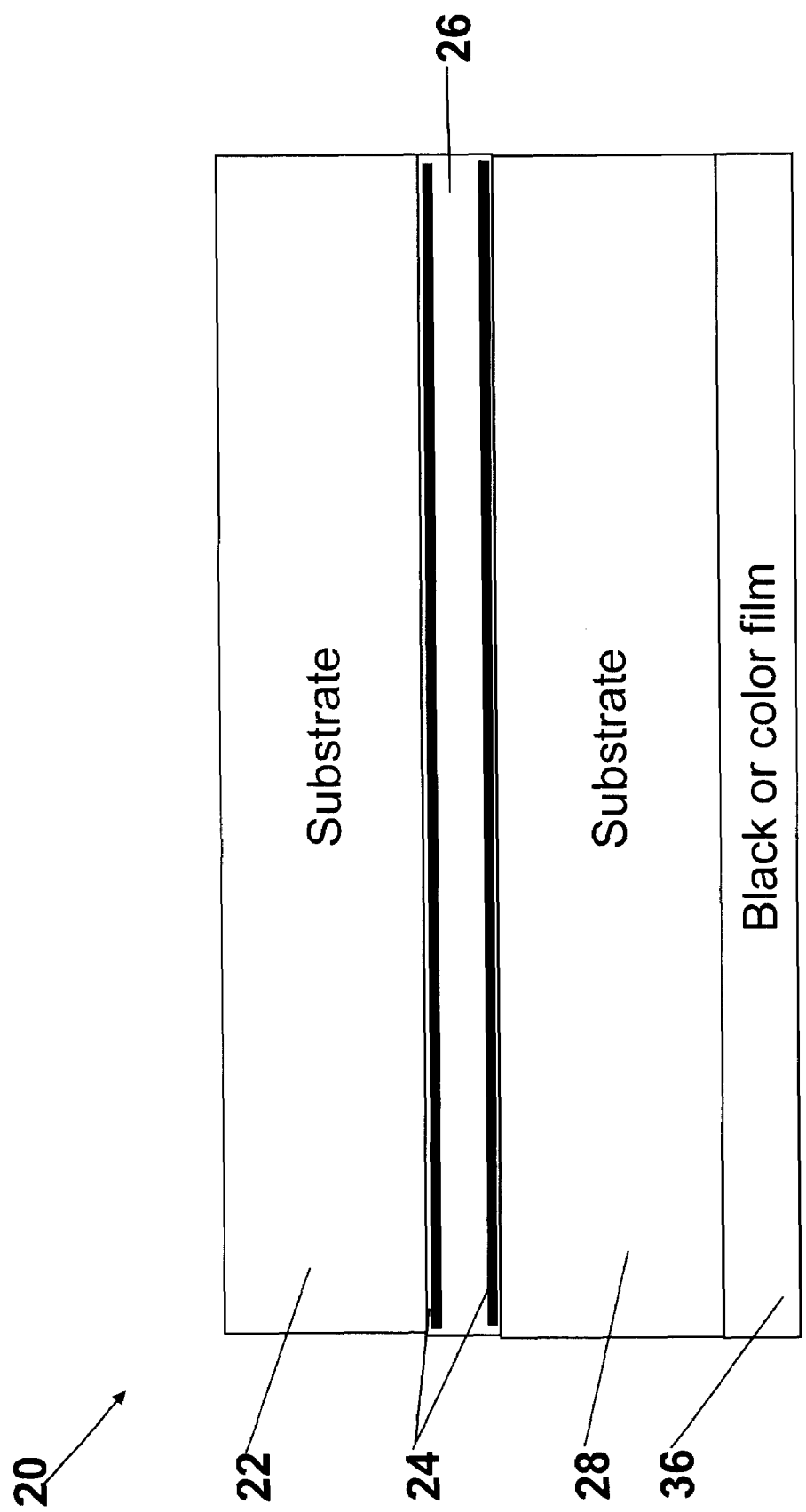
Figure 10:
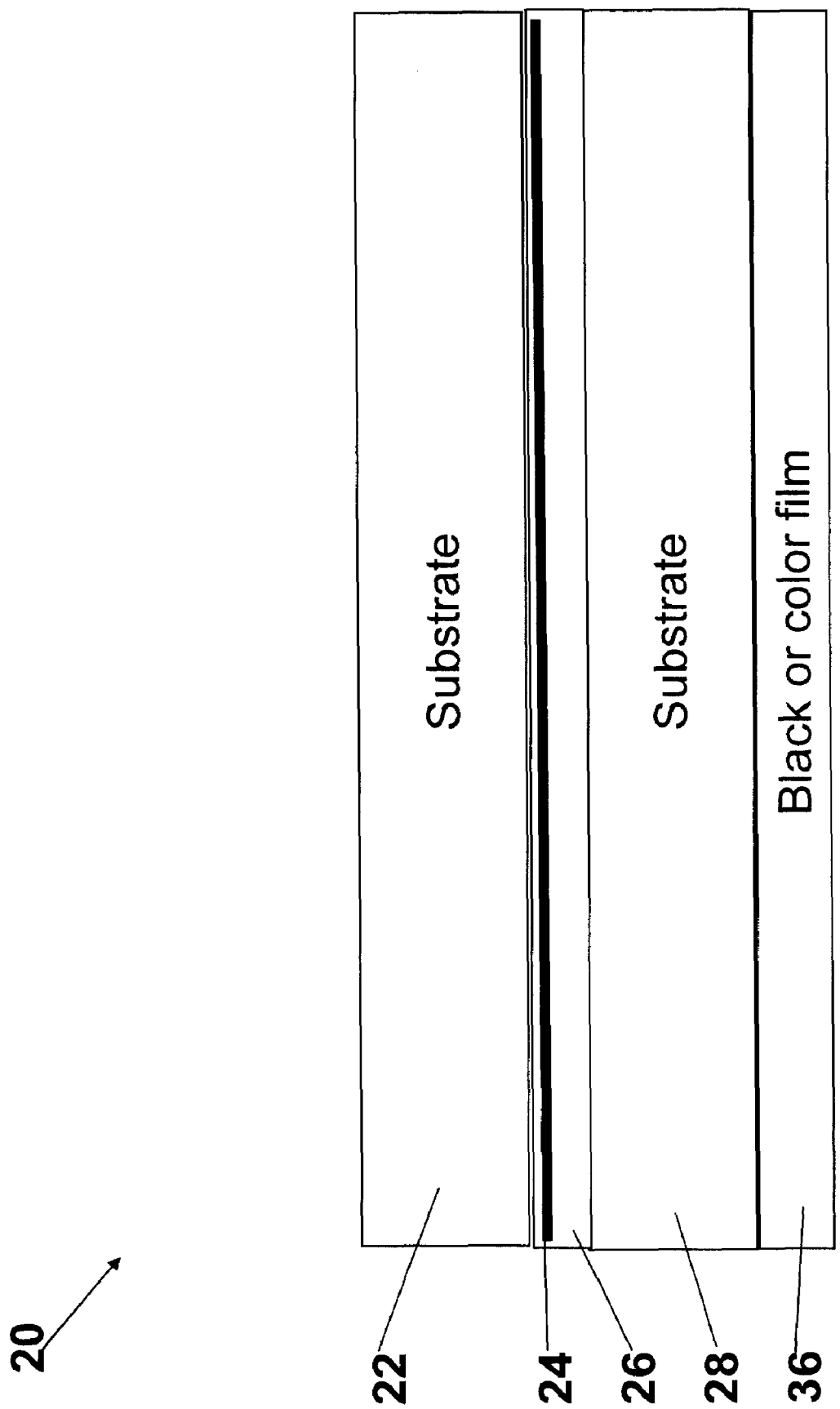
Figure 11:
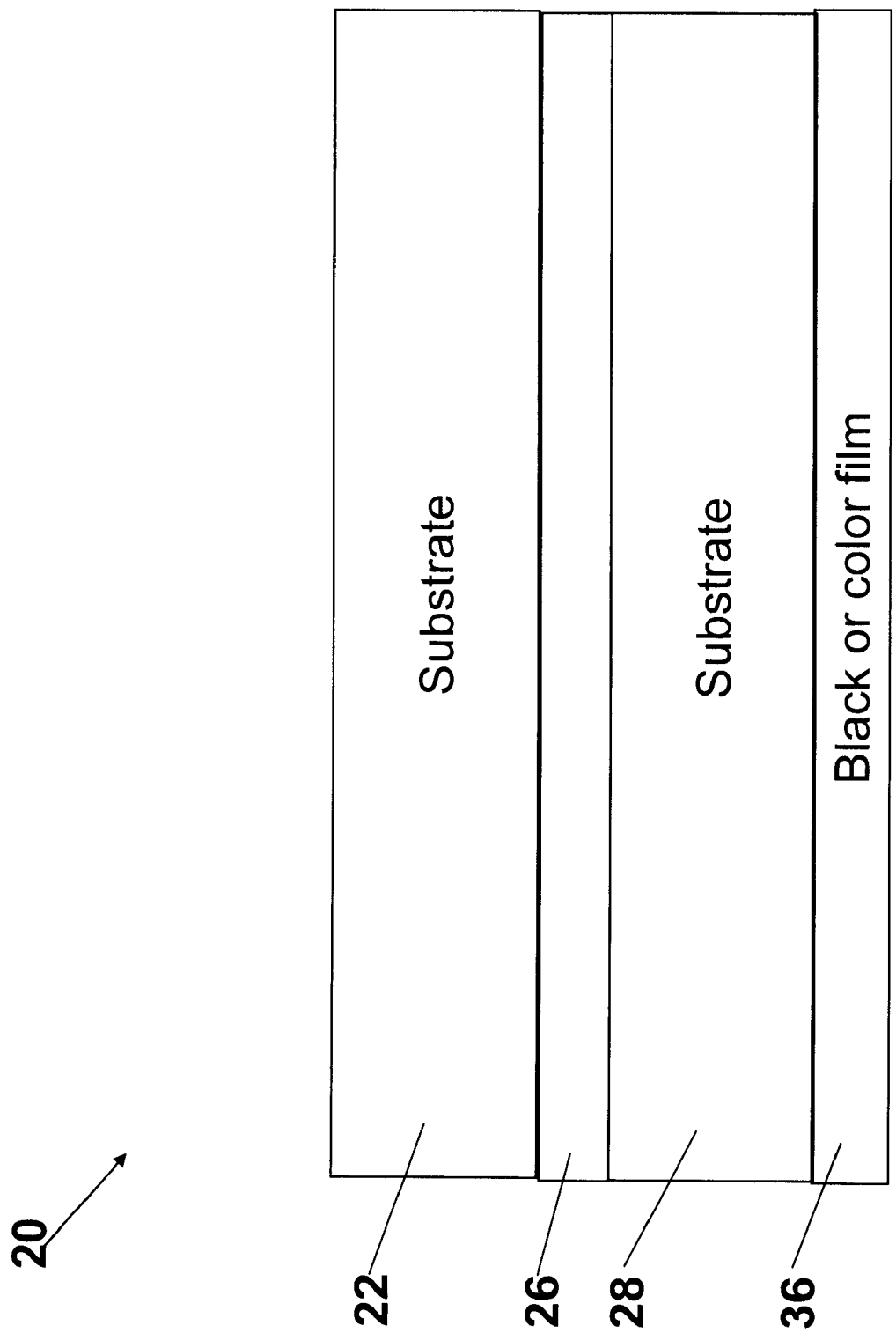
Figure 12:
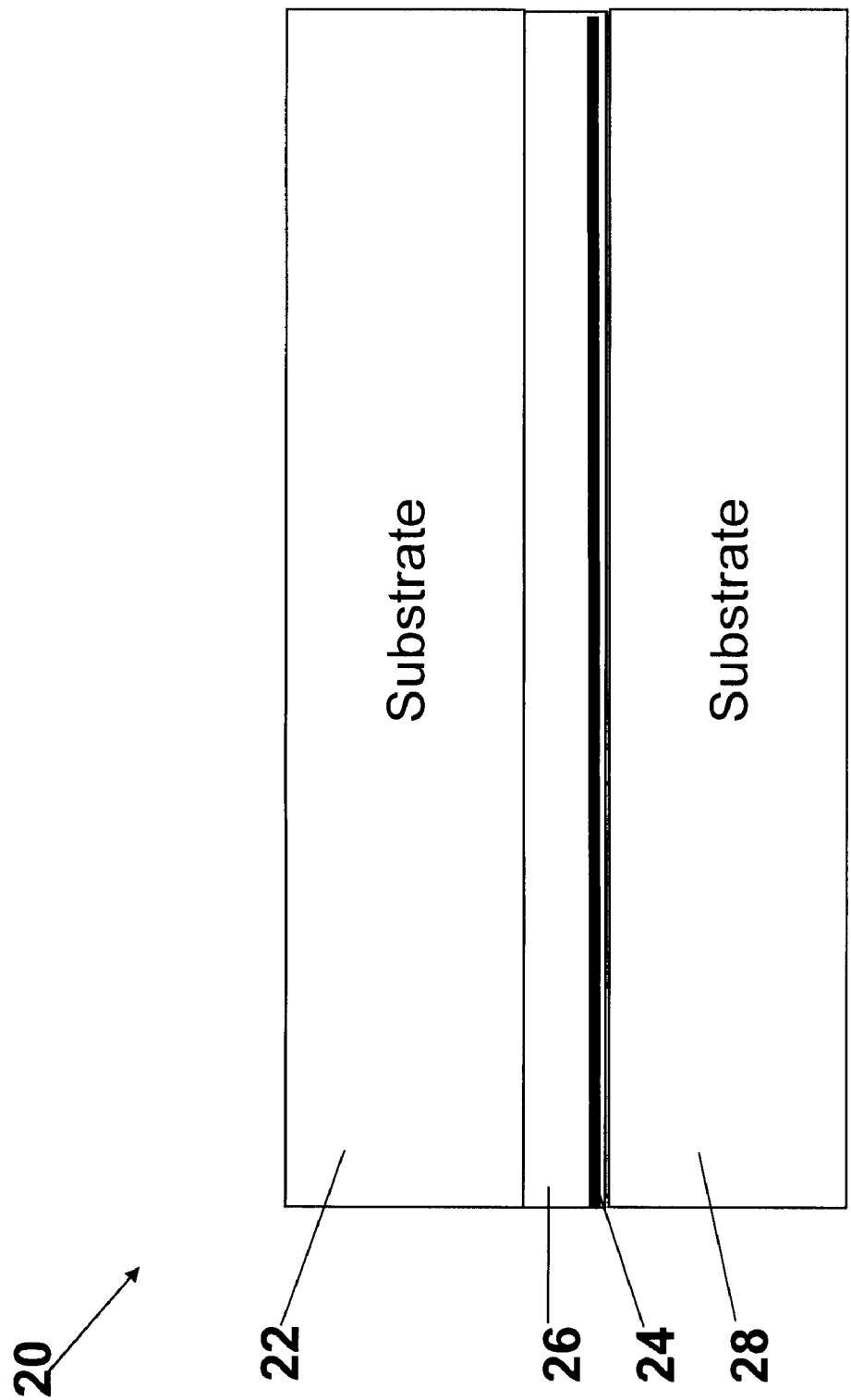
Figure 13:
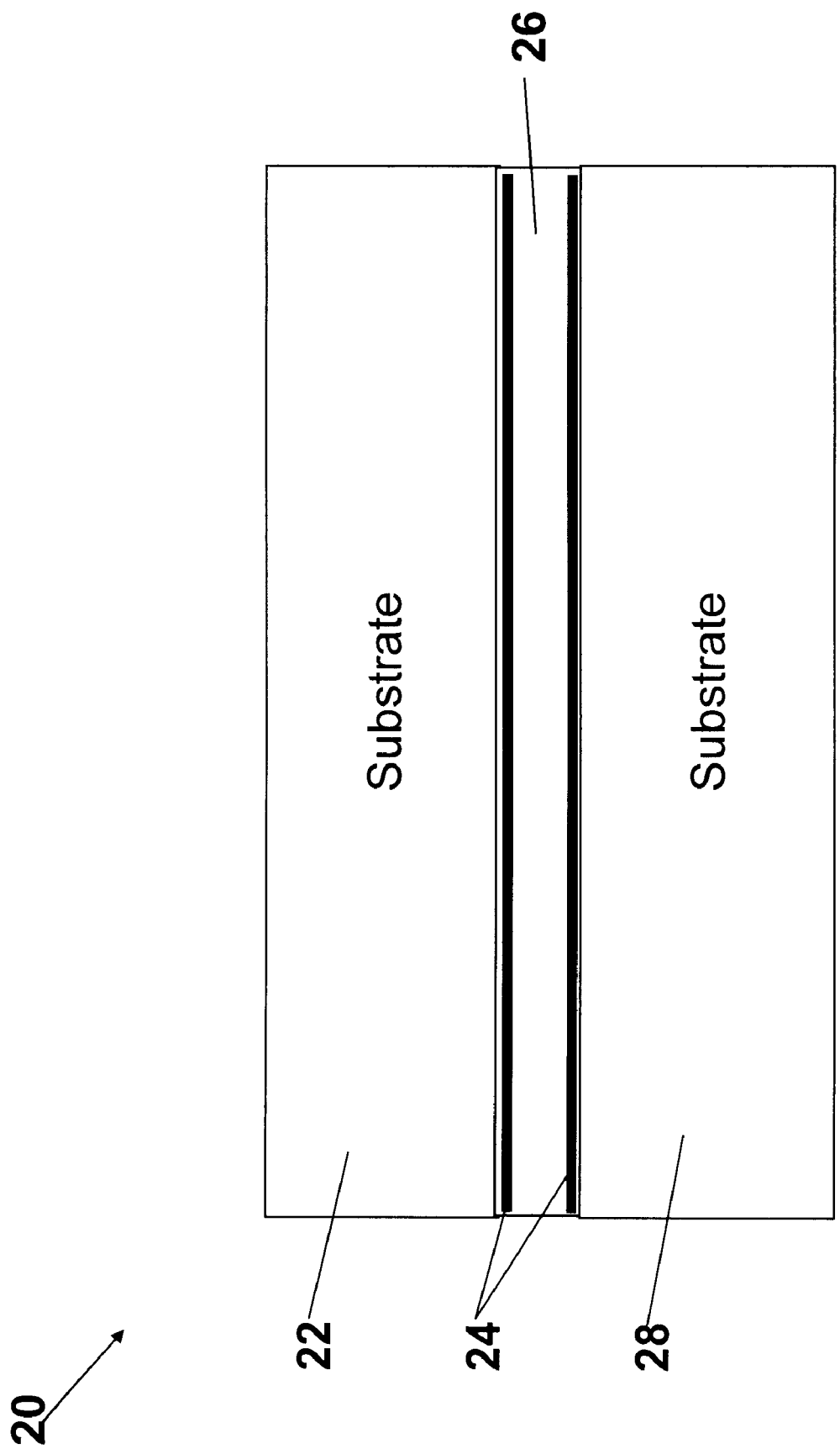
Figure 14:
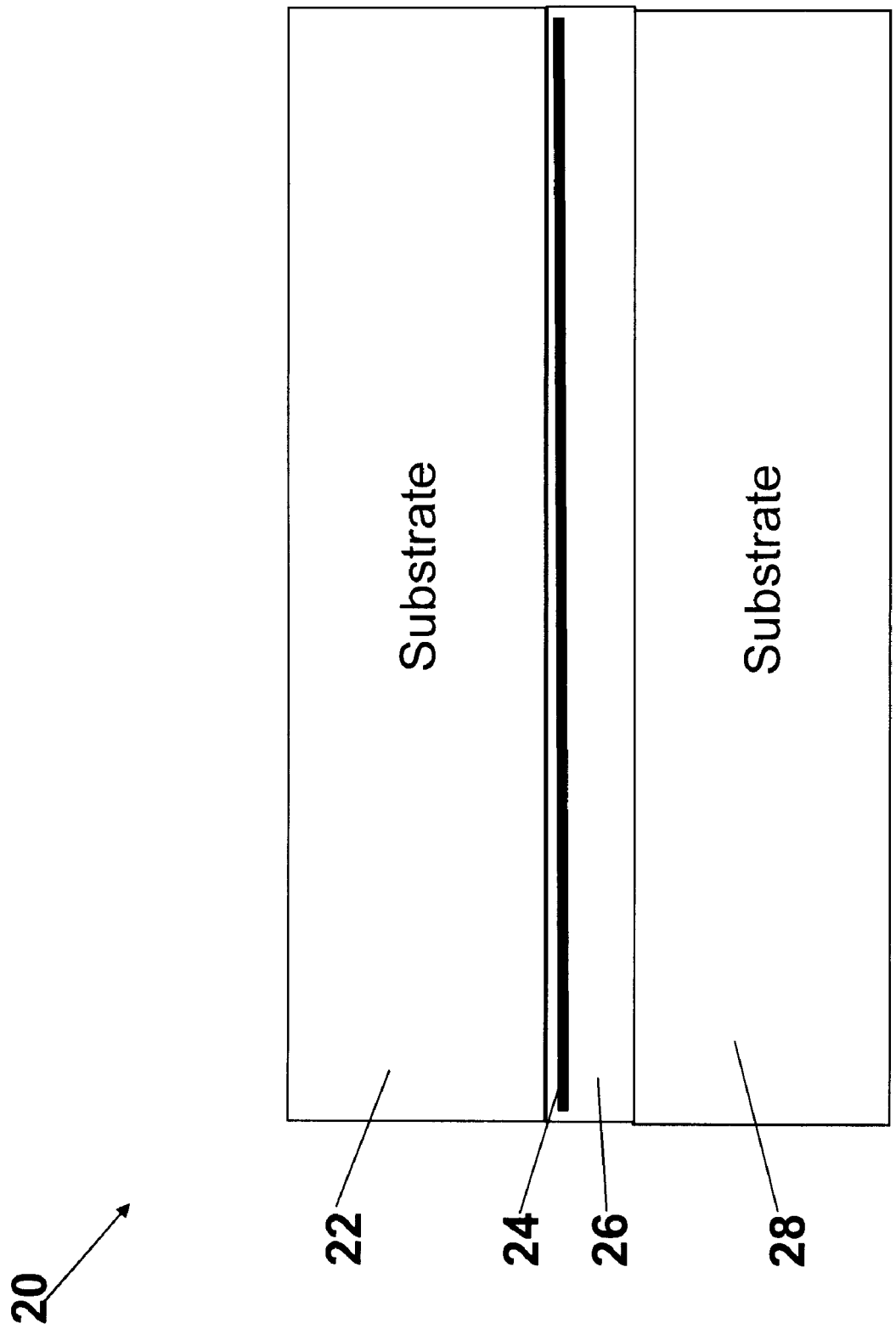
Figure 15:
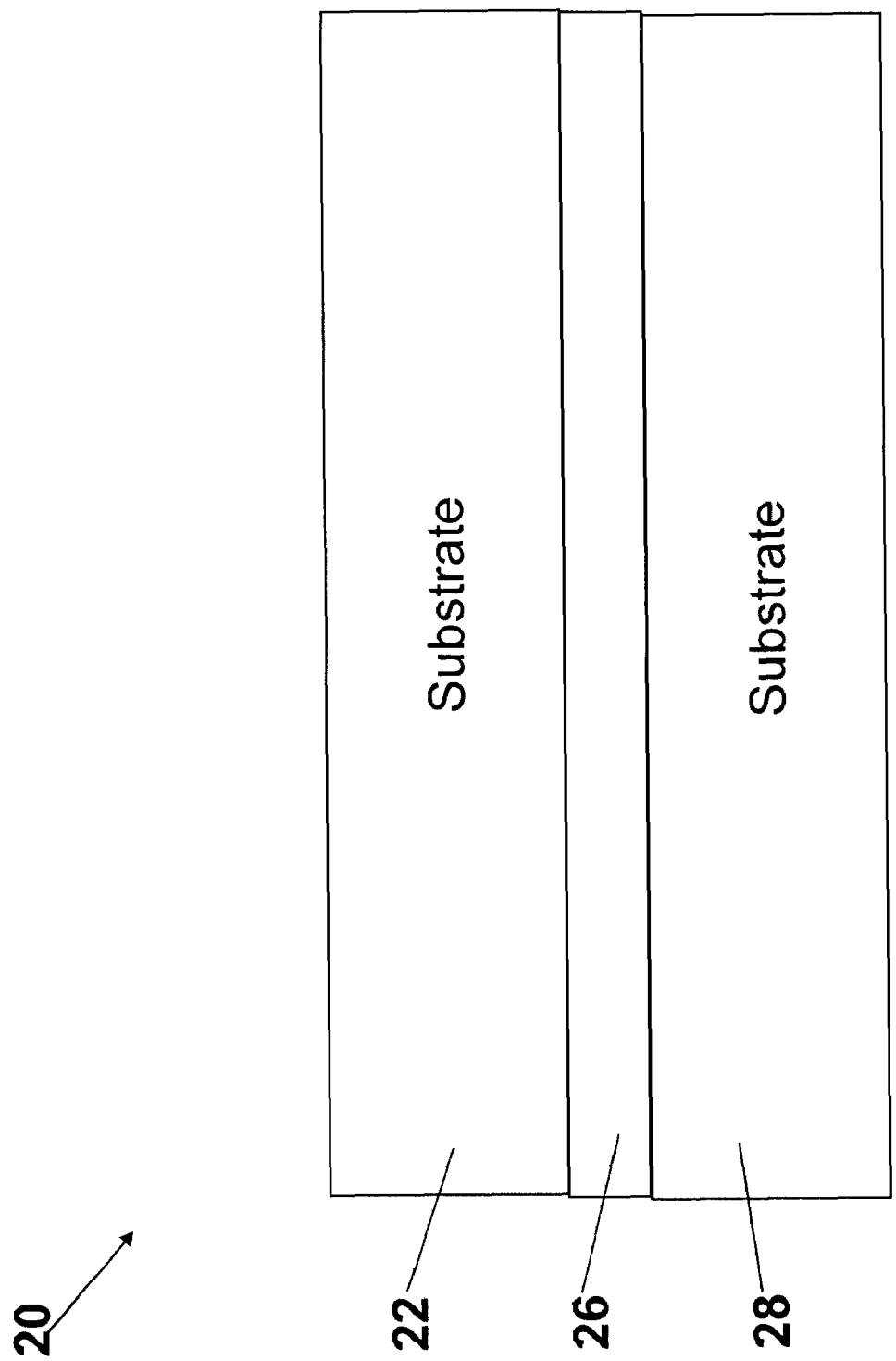

In the embodiment shown in FIG. 9, the display 20 may include the top and bottom substrates 22, 28, the liquid crystal material 26 with the alignment layer 24 on both the top and bottom substrates, and the film layer 36 that may be black or a color film. In the embodiment shown in FIG. 10, the display 20 may include the top and bottom substrates 22, 28, the liquid crystal material 26 with the alignment layer 24 on the top substrate and the film layer 36 that may be black or a color film. In the embodiment shown in FIG. 11, the display 20 may include the top and bottom substrates 22, 28, the liquid crystal material 26, and the film layer 36 that may be black or a color film. In the embodiment shown in FIG. 12, the display 20 may include the top bottom substrates 22, 28 and the liquid crystal material 26 with the alignment layer 24 on the bottom substrate. In the embodiment shown in FIG. 13, the display 20 may include the top and bottom substrates 22, 28 and the liquid crystal material 26 with the alignment layer 24 on the top and bottom substrates. In the embodiment shown in FIG. 14, the display 20 may include the top and bottom substrates 22, 28 and the liquid crystal material 26 with the alignment layer 24 on the top substrate. In the embodiment shown in FIG. 15, the display 20 may include the top and bottom substrates 22, 28 and the liquid crystal material 26. In the embodiment shown in FIGS. 12-15 in which no film layer is present, the display device takes on the look of frosted glass with text or image on the frosted glass.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A composition, comprising:
a negative liquid crystal material doped with at least one of a chiral compound and an ionic compound, wherein the negative liquid crystal material does not include a polymer network;
wherein that liquid crystal material is responsive to a first electromagnetic signal to enter a substantially stable transmissive state to provide a pixel with a substantial contrast or color variation compared with a relatively bright pixel; and
wherein that liquid crystal material is responsive to a second electromagnetic signal to enter a substantially stable reflective state in which ambient light is capable of being reflected by the liquid crystal material to provide a relatively bright pixel.

2. The composition of claim 1, wherein that liquid crystal material has a relatively high negative dielectric anisotropy, high birefringence and low viscosity.

3. The composition of claim 1, wherein that liquid crystal material includes a plurality of cholesteric liquid crystal molecules.

4. The composition of claim 1, wherein that liquid crystal material includes at least one of glass beads, polymeric microfibers, polymeric microspheres and sticky glass beads or other spacers used in LCD display construction.

5. The composition of claim 1, wherein that liquid crystal material further comprises one or more spaced beads mixed into the liquid crystal material.

6. The composition of claim 3, wherein the reflective state includes a focal conic texture of the cholesteric liquid crystal molecules.

7. The composition of claim 3, wherein the transmissive state includes a planar texture of the cholesteric liquid crystal molecules.

8. The composition of claim 3, wherein the transmissive state includes a planar texture of the cholesteric liquid crystal molecules and wherein the reflective state includes a focal conic texture of the cholesteric liquid crystal molecules.

9. The composition of claim 1, wherein the liquid crystal material has a predetermined percentage of the ionic compound so that a color pixel is capable of being displayed.

10. A display device, comprising:
a top substrate and a bottom substrate;
a negative liquid crystal material sandwiched between the top and bottom substrates, the negative liquid crystal material being doped with at least one of a chiral compound and an ionic compound, wherein the negative liquid crystal material does not include a polymer network;
wherein that negative liquid crystal material is responsive to a first electromagnetic signal to enter a substantially stable transmissive state to provide a pixel with a substantial contrast or color variation compared with a relatively bright pixel; and
wherein the negative liquid crystal material is responsive to a second electromagnetic signal to enter a substantially stable reflective state in which ambient light is capable of being reflected by the negative liquid crystal material to provide a relatively bright pixel.

11. The display device of claim 8, wherein that liquid crystal material has a relatively high negative dielectric anisotropy, high birefringence and low viscosity.

12. The display device of claim 8, wherein that liquid crystal material includes a plurality of cholesteric liquid crystal molecules.

13. The display device of claim 8, wherein that liquid crystal material includes at least one of glass beads, polymeric microfibers, polymeric microspheres and sticky glass beads.

14. The display device of claim 8, wherein that liquid crystal material further comprises one or more spaced beads mixed into the liquid crystal material.

15. The display device of claim 10, wherein the reflective state includes a focal conic texture of the cholesteric liquid crystal molecules.

16. The display device of claim 10, wherein the transmissive state includes a planar texture of the cholesteric liquid crystal molecules.

17. The display device of claim 10, wherein the transmissive state includes a planar texture of the cholesteric liquid crystal molecules and wherein the reflective state includes a focal conic texture of the cholesteric liquid crystal molecules.

18. The display device of claim 10, wherein the liquid crystal material has a predetermined percentage of the ionic compound so that a color pixel is displayed.

19. The display device of claim 10 further comprising a set of electrodes wherein each electrode defines an independently controllable pixel of the negative liquid crystal material to form one of a segmented display and a dot matrix display.

20. The display device of claim 10 further comprising an optical film that modulates the reflective backscatter of the display device.

21. The display device of claim 12 further comprising an alignment layer, disposed on at least one of the top substrate and bottom substrate, that aligns the cholesteric liquid crystal molecules.

22. The display device of claim 21, wherein the alignment layer further comprises a homeotropic alignment layer that promotes the homeotropic alignment of the cholesteric liquid crystal molecules.

23. The display device of claim 22, wherein the homeotropic alignment layer further comprises one of a polymeric material and a polyimide coating.

* * * * *